United States Patent [19]

Tsuchiya et al.

[11] 3,968,328

[45] July 6, 1976

[54] CIRCUIT FOR AUTOMATICALLY CORRECTING THE TIMING OF CLOCK PULSE IN SELF-CLOCKED PULSE SIGNAL DECODERS

[75] Inventors: Yoshikazu Tsuchiya; Takenori Sonoda, 3, both of Tokyo; Jun Takayama, Kokubunji, all of Japan

[73] Assignee: Sony Corporation, Tokyo, Japan

[22] Filed: Dec. 18, 1974

[21] Appl. No.: 533,773

[30] Foreign Application Priority Data

Dec. 18, 1973 Japan.............................. 48-142049

[52] U.S. Cl................................ 178/88; 329/104; 340/347 DD; 360/41
[51] Int. Cl.² ......................................... H04L 25/40
[58] Field of Search ................... 360/39, 40, 41, 51; 178/88; 340/347 DD; 329/104, 107

[56] References Cited
UNITED STATES PATENTS

| | | | |
|---|---|---|---|
| 3,414,894 | 12/1968 | Jacoby ......................... | 340/347 DD |
| 3,815,108 | 6/1974 | McGrath et al. ................... | 360/41 |
| 3,815,122 | 6/1974 | Schwartz et al. ..................... | 360/40 |
| 3,852,809 | 12/1974 | Coker, Jr. ............................ | 360/40 |
| 3,852,810 | 12/1974 | McGrath et al. ..................... | 360/51 |

Primary Examiner—Malcolm A. Morrison
Assistant Examiner—Errol A. Krass, Jr.
Attorney, Agent, or Firm—Lewis H. Eslinger; Alvin Sinderbrand

[57] ABSTRACT

In dynamic modulation (D.M.) of non-return-to-zero pulse signals, the only condition under which the D.M. signal would remain in the same state, either 1 or 0, for two consecutive pulse intervals is when the NRZ signal includes the sequence 101. Two sampling signals at the proper clock repetition rate are generated from the D.M. signal by the decoder and are successively used to sample the D.M. signal and to sample the signal resulting from the first sampling. Information of the state of the D.M. signal at the time of the first sampling is retained to be compared with the state of the D.M. signal at a later time, and the state of one of the compared signals is separately compared with the state of a signal between the first-compared signals. If the wrong clock pulses midway between the correct clock pulses are used in making the comparisons, a correction signal will be generated in the last half of the second consecutive pulse interval in which the D.M. signal remains in the same state. This correction signal is used to adjust the clock pulse selector to select the correct pulses.

12 Claims, 6 Drawing Figures

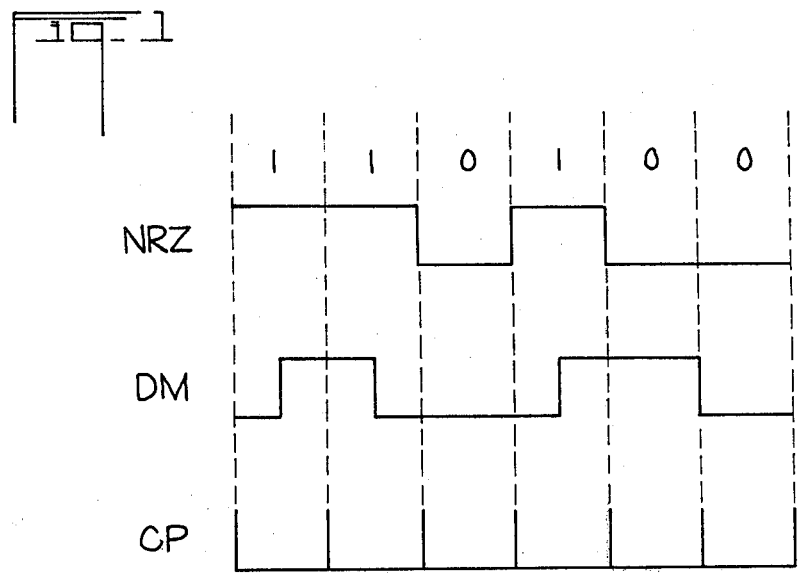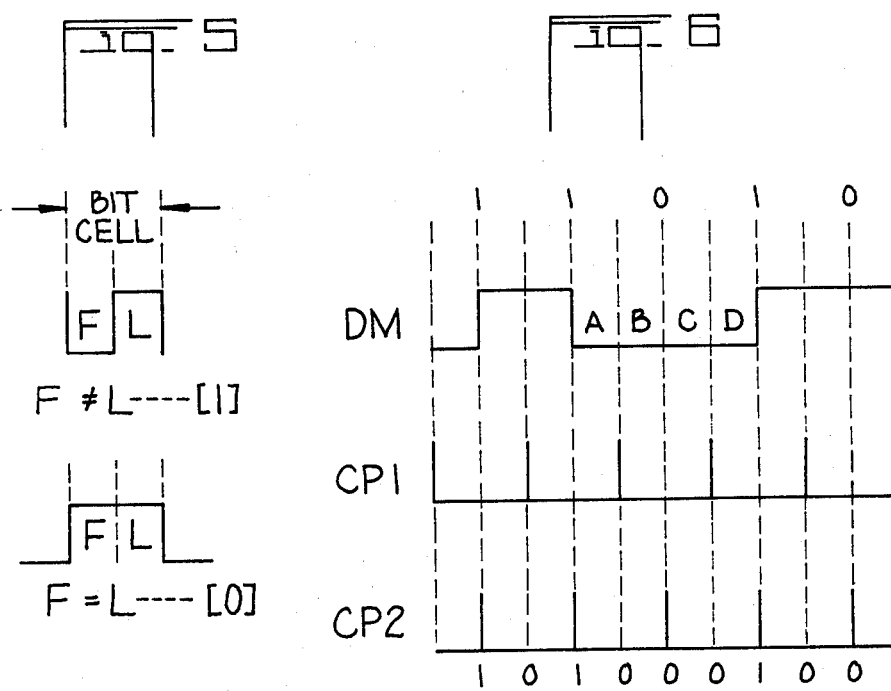

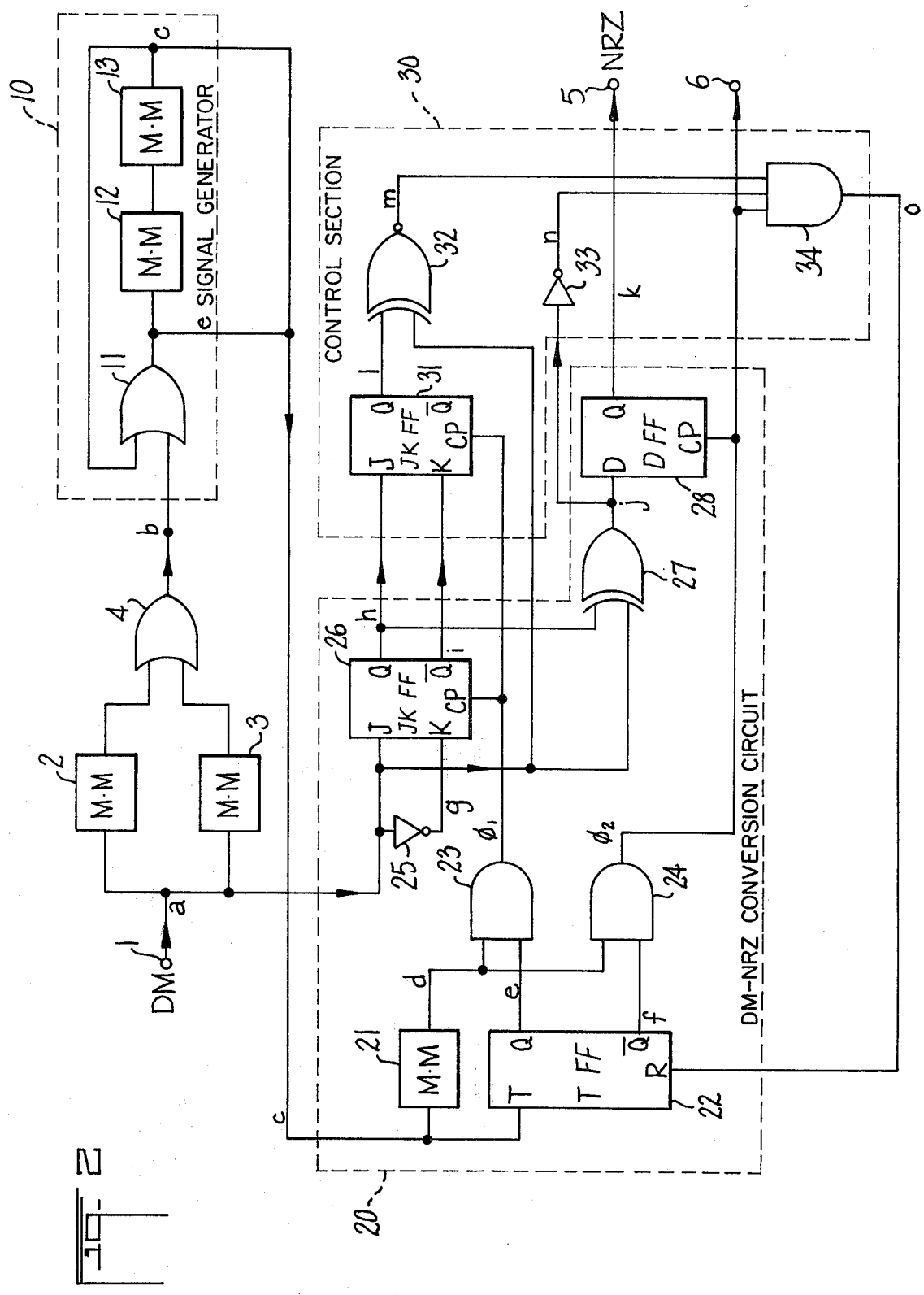

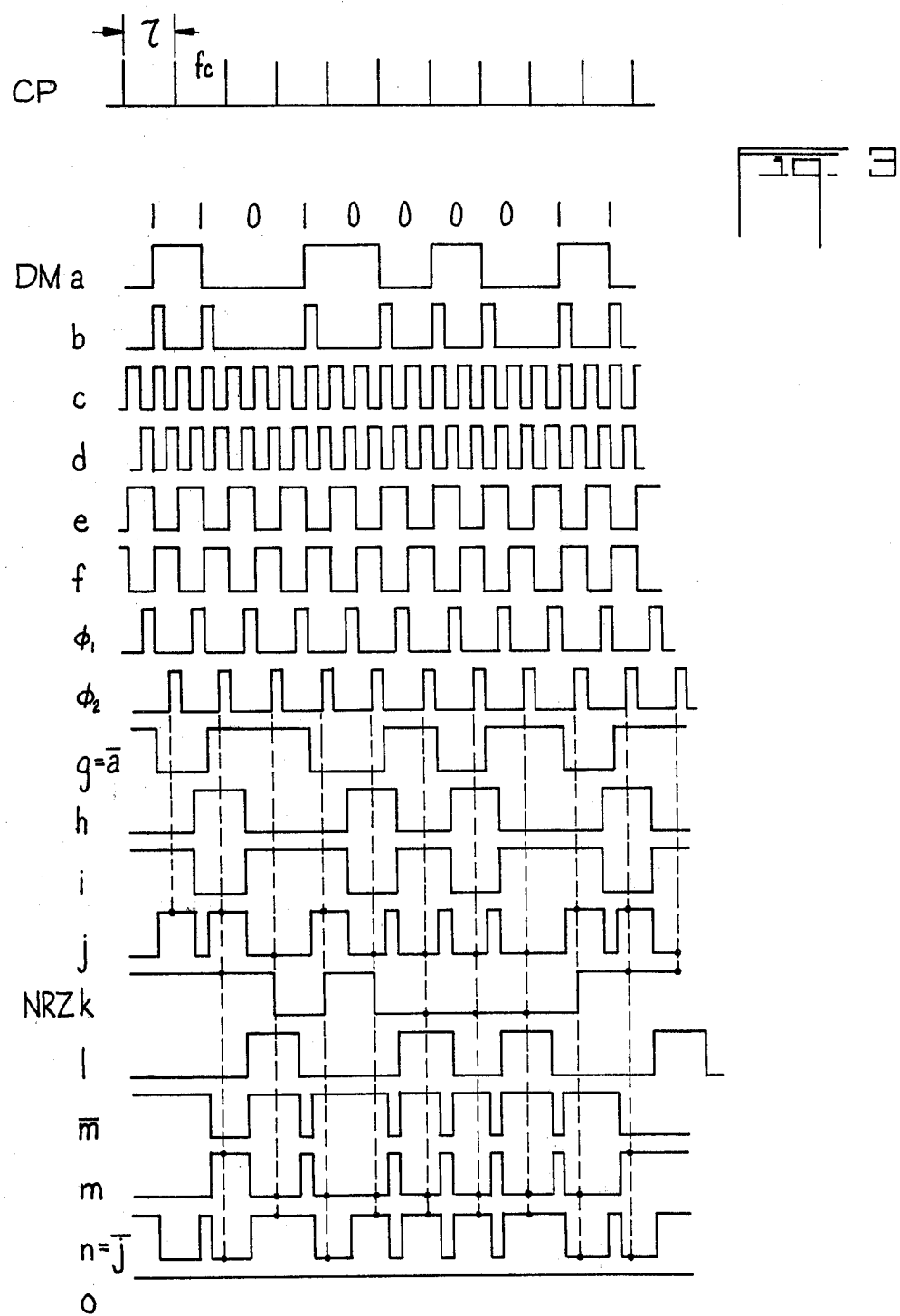

CIRCUIT FOR AUTOMATICALLY CORRECTING THE TIMING OF CLOCK PULSE IN SELF-CLOCKED PULSE SIGNAL DECODERS

BACKGROUND OF THE INVENTION

1. Field of the Invention

This invention relates to the field of pulse code modulation systems using dynamically modulated (DM) non-return-to-zero (NRZ) signals with self-clocking, and in particular, it relates to a circuit for selecting the correct clock pulses from a series of pulses that includes both the correct clock pulses and an interleaved set of pulses of the same frequency but timed midway between the correct clock pulses.

2. The Prior Art

When information is transmitted by means of a series of electrical pulses that can have either of two values which may be identified as 1 and 0, it is possible for the nature of the information to require that an indefinitely long series of pulses of one of the two values be transmitted. Thus, it might be necessary to transmit a long series of 0's or a long series of 1's. There is no difficulty in decoding such a signal if a clock pulse signal is also transmitted. However, the transmission of a clock pulse signal on a separate transmission medium or on a separate part of the same transmission medium as the information signal is considered to be wasteful of the medium or of the transmission equipment, and it has been found desirable to include the clock signal with the information signal in such a form that the clock signal can be extracted without adversely affecting the information signal.

U.S. Pat. No. 3,414,894 describes encoding and decoding apparatus in connection with a system that uses DM-NRZ pulses. The pulses have fixed, equal intervals which are referred to as bit cells. Even if the NRZ pulses were required to remain in one state for an indefinite interval of time, in which case the clock signal would normally be lost, the DM technique applied to steady NRZ pulses of one state results in DM pulses that swing back and forth between their two states at the basic repetition rate of the system. This regular change of the pulses from one state to the other would make available the clock signal that could be used in demodulating or decoding, the DM pulse signal.

However, the standard of DM requires that the state of a pulse during a given interval, or bit cell, be changed at the center of that bit cell if the pulse being subjected to DM is a 1 and that the DM signal remain in the same state if the pulse being encoded is a 0, except that the DM signal must change from one state to the other at the beginning of a second successive 0 pulse and at the beginning of the subsequent successive 0 pulses.

The clock signal is usually derived from the DM pulse signal by generating pulses that are timed to coincide with the transitions of the DM pulse signal from one state to the other. The difficulty is that some of these transitions occur at the intersection between successive bit cells, in the case of multiple successive 0 pulses, and other intersections occur in the middle of bit cells, in the case of the DM pulse signals that represent 1's. Although there may be a long sequence of DM signals representing 0's or representing 1's, any usable information will require that the DM signal include both 0's and 1's. The encoding requirement previously stated means that each DM pulse will have a duration at least as long as a bit cell of the original NRZ pulse signal but may include one and one-half bit cells or even two bit cells. It is a unique feature of the encoding definition that the only occasion when the DM signal can include two bit cells is in the encoding of an NRZ pulse sequence 101. It is to be understood that the 101 sequence may occur by itself or as part of a much longer sequence.

It is an object of the present invention to make use of the unique characteristics of a DM signal having a duration of two bit cells to obtain information concerning the correct timing of clock pulses obtained from the DM signal.

SUMMARY OF THE INVENTION

In accordance with the present invention a circuit is provided for deriving a series of pulses at twice the base repetition rate and synchronized to transitions between the two states of a DM signal. Thus, the pulses can be synchronized by transitions between successive bit cells and by transitions at the centers of the bit cells. This series of pulses is separated by means of a selecting circuit into two series of pulses each having the same repetition rate as the basic pulse repetition rate of the system. The pulses of these two series are interleaved in time, and the pulses of one of the series correspond to those transitions of the DM signal between successive bit cells while the pulses of the other series correspond to those transitions of the DM signal at the centers of bit cells. The pulses of both of these interleaved series are, in effect, delayed for a short time, such as one-fourth of a bit cell, and are separated by a separating circuit into two sets of clock, or sampling, pulses, one of which has a leading edge which occurs one-fourth of the way through a bit cell and the other of which has a leading edge that occurs three-fourths of the way through a bit cell.

The DM signal is, in effect, sampled by one of the latter series of pulses. The sampling circuit, which may be a JK flip-flop, produces an output pulse that retains, for an interval of time equal to a bit cell, the information of the state of the DM signal at the instant of sampling. If the proper set of clock pulses is used, the output pulse signal of the flip-flop will represent the state of the first half of a one bit cell. This information is retained at the output of the flip-flop for a full bit and thus overlaps, in time, the second half of the same bit cell.

The overlapping signals are compared in a logic circuit that has the same truth table as the translation of the DM pulses to NRZ pulses, namely:

| 1st half | 2nd half | NRZ signal |
|---|---|---|
| 0 | 0 | 0 |
| 0 | 1 | 1 |
| 1 | 0 | 1 |
| 1 | 1 | 0 |

An exclusive OR gate has such a truth table. In order to transform the output of the exclusive OR gate into the NRZ signal, the output of the exclusive OR gate is first sampled during the second half of the bit cell. The resultant signal is then retained for the duration of a bit cell. This can be done by applying the output signal of the exclusive OR gate to a D-type flip-flop and clocking the latter with the other set of clock pulses. If the proper sets of clock pulses are being used, the latter set occurs during the second half of the same bit cell.

In order to determine which set of clock pulses occurs during the first half of each bit cell and which occurs during the second half, the retained signal at the output of the JK flip-flop is again sampled, for example in a second JK flip-flop, actuated by the same clock pulse as the first flip-flop. The second flip-flop produces an output signal corresponding to the sampled signal but delayed by the same unit of time as the duration of one bit cell. The output of the second JK flip-flop is compared with the original DM signal in an exclusive NOR gate, and if the correct series of pulses occurring during the first half of each bit cell is used as the series of clock pulses for the two JK flip-flops, the exclusive NOR gate will produce an output signal that represents a comparison of the state of the first half of each bit cell of the DM signal in sequence with the state of the second half of the next bit cell. This is important when the DM signal being subjected to such comparison is one that encodes a 101 NRZ sequence.

The circuit also includes an AND gate to compare the previously compared overlapping signals from the exclusive OR gate with output signals from the exclusive NOR gate. It is necessary to invert the output signal of the exclusive OR gate before applying such signals to the AND gate. The AND gate has a third input connected to receive the same clock pulses as were used to clock the D-type flip-flop. The output of the AND gate is connected to the selector circuit that selects which of the two interleaved series of pulses is to be used as clock pulses for the JK flip-flops and which is to be used as clock pulses for the D-type flip-flop. If the selection is incorrect, the AND gate will produce a correction pulse during the first half of the bit cell representing the second 1 of the 101 sequence, and this pulse may be used to correct the operation of the selecting circuit so that the proper series of pulses will be selected for clock pulses.

BRIEF DESCRIPTION OF THE DRAWINGS

FIG. 1 is a series of waveform diagrams of NRZ, DM, and clock pulse signals encountered in the use of this invention.

FIG. 2 is one embodiment of a decoding circuit for selecting the proper clock pulses for decoding a DM signal in accordance with this invention.

FIG. 3 is a series of waveforms encountered in the operation of the circuit in FIG. 2.

DETAILED DESCRIPTION OF THE PREFERRED EMBODIMENTS

Figure 4:
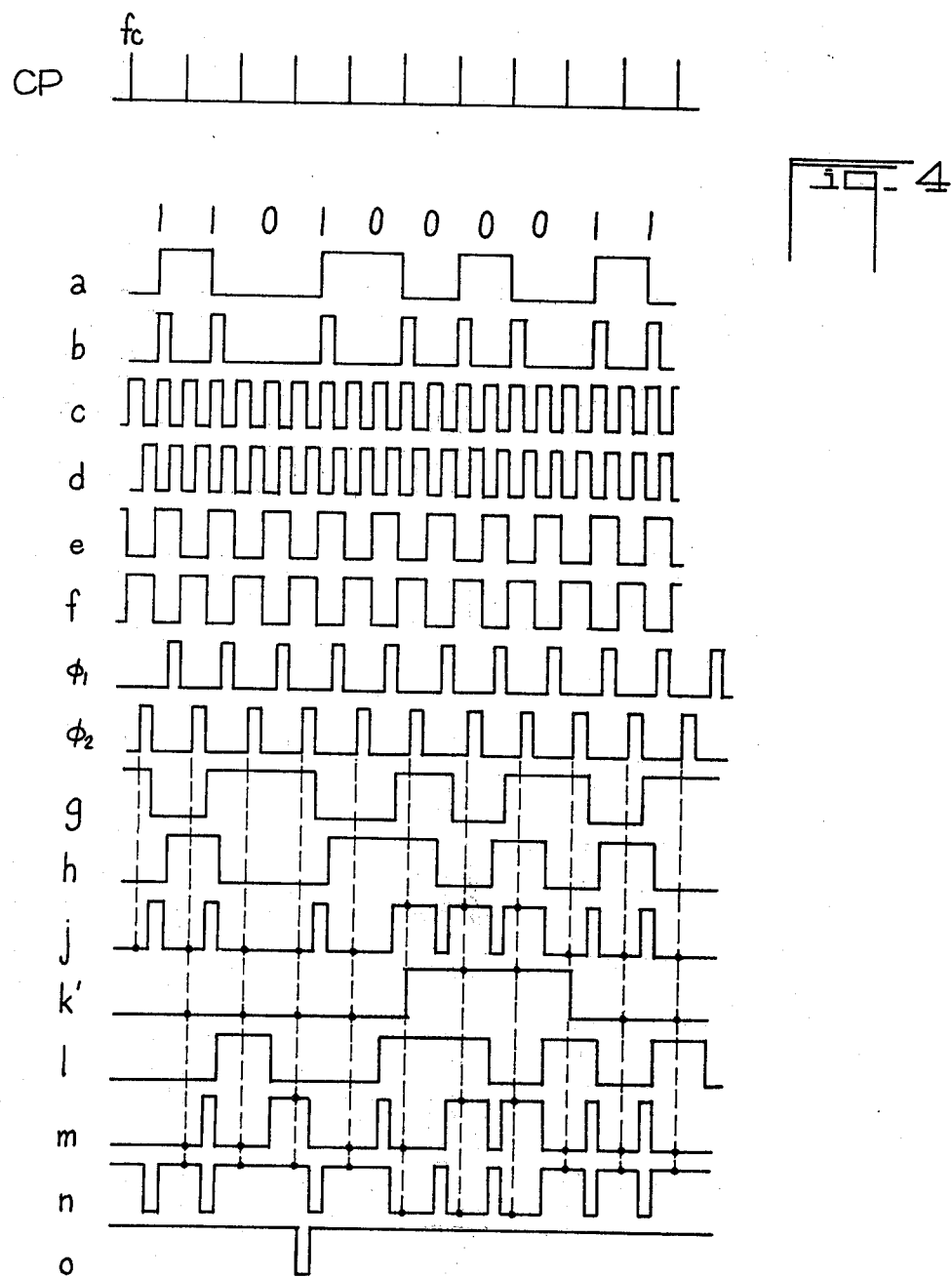
FIG. 4 is a series of waveforms corresponding to those in FIG. 3, but encountered when the wrong series of pulses is selected for clock pulses.

FIG. 1 shows three waveforms identified as NRZ, DM, and CP. Each of these waveforms has a certain relationship to six consecutive time intervals, or bit cells. The NRZ signal, which is the signal that carries the basic information, consists of two successive 1 pulses followed by a 0 pulse and then another 1 pulse and finally two successive 0 pulses. The NRZ pulse is indicated as if it were a voltage having two levels, one high and the other low. In the case of an NRZ signal, it is typical for the high value, or 1 value, to have one polarity and for the low value, or 0 value, to have the opposite polarity. It is not necessary that the 0 value be zero volts.

In accordance with the standards of DM, the NRZ signal, when decoded according to DM, produces a pulse signal that changes from one step to the other in the center of each of the 1 pulses of the NRZ signal. It happens that the DM signal goes from its 0 value to its 1 value in the first bit cell, but this is arbitrary, and it is also possible for the DM signal to start at the 1 value and change to the 0 value in the center of a bit cell to encode a 1 pulse of the NRZ signal.

Further, in accordance with the standards of DM, the DM signal does not change its state in encoding the first 0 of the NRZ signal. As a result, the DM signal remains at its 0 value for a total of two bit cells, beginning half-way through the second bit cell and continuing to a point half-way through the fourth bit cell in order to encode the 101 sequence.

Also in accordance with the standards of DM, the DM signal has a transition from its one value to its zero value at the intersection between two successive zeros of the NRZ signal.

The clock pulses CP are indicated as occurring at the intersection between adjacent bit cells. This means that the sixth clock pulse CP occurs coincidentally with the transition of the DM signal from its 1 value to its 0 value. However, the other clock pulses CP do not coincide with the transitions that occur in the middle of the first, second, and fourth bit cells in which 1's are encoded.

The encoding of the 101 sequence has several unique characteristics. It is the only DM signal that remains in one state for a total length of time equal to two bit cells. Furthermore, it never starts or ends at the intersection between two bit cells but always in the middle of a bit cell. Thus, in the bit cell in which the first 1 of the 101 sequence is encoded, the first half of the DM signal must have a state opposite that of the second half. The two halves of the bit cell in which the 0 is encoded must have the same state, either 1 or 0, as the second half of the preceding bit cell. The first half of the bit cell in which the second 1 of the 101 sequence is encoded must have the same state as the preceding cell and this state must be opposite to the state during the second half of the cell in which the second 1 is encoded.

In decoding the DM signal back to the NRZ form using clock pulses extracted from the DM signal itself, it is necessary to have the clock pulses properly timed with respect to the bit cells. As will be described hereinafter, this is done by comparing the states of several halves of the three bit cells involved in the 101 sequence, but it is not necessary to provide means to examine each of the six halves involved. If it is determined that a half bit has the same polarity as another half bit that occurred one and one half bits previously, and if these two half bits also have the same state as one of the two half bits that occurs between them, then the signal must be a 101 sequence as depicted by the central part of DM signal in FIG. 1, and the clock pulses must have the same relationship to that 101 sequence as the pulses CP in FIG. 1. Other portions of the signal representing the 101 sequence can be analyzed instead.

FIG. 2 shows a decoder to which a DM signal of the type shown in FIG. 1 may be applied. This decoder has an input terminal 1 connected to inputs of two monostable multivibrators 2 and 3. The outputs of these multivibrators are connected through an OR gate 4 to a signal generator 10. The input terminal of the signal generator 10 is one of the input terminals of an OR gate 11 that has its output connected to the input of another monostable multivibrator 12. The output of the latter is connected to the input of still another monostable multivibrator 13 that has its output connected back to a second input of the OR gate 11 and to the input of the monostable multivibrator 12. The output of the multivibrator 13 is also connected to a DM-NRZ conversion circuit 20. The input of the conversion circuit is connected to a monostable multivibrator 21 and to the T-terminal of a T-type, or triggerable, flip-flop 22. This flip-flop has two output terminals labeled Q and Q connected to input terminals of a pair of AND gates 23 and 24. Each of the AND gates has another input terminal connected to the monostable multivibrator 21.

The input terminal 1 is connected to an inverter 25 and to the J-terminal of a JK flip-flop 26. The output of the inverter 25 is connected to the K-terminal of this flip-flop and the output of the AND gate 23 is connected to the clock pulse terminal CP. The input terminal 1 is also connected to an output terminal of an exclusive OR gate 27 that has a second input terminal connected to the Q output terminal of the JK flip-flop 26. The output terminal of the OR gate 27 is connected to the D terminal of a D-type flip-flop 28. The output of the AND gate 24 is connected to the clock pulse terminal CP of the flip-flop 28. The Q terminal of the flip-flop 28 is connected to an NRZ signal output terminal 5 and the output terminal of the AND gate 24 is connected to another clock pulse output terminal 6.

The section of the circuit that automatically controls the operation of the flip-flop 22 from which clock pulses are obtained is the control section 30. This includes another JK flip-flop 31, the J and K input terminals of which are connected to the Q and Q terminals of the flip-flop 26. The output terminal of the AND gate 23 is connected to the clock pulse terminal CP of the flip-flop 31. The Q output terminal of the flip-flop 31 is connected to one of the input terminals of an exclusive NOR gate 32, and the input terminal 1 is connected to the other input terminal of the NOR gate 32. The output terminal of the OR gate 27 is connected through an inverter 33 to one of the input terminals of an AND gate 34. A second input terminal of the AND gate 34 is connected to the output terminal of the NOR gate 32, and a third input terminal of the AND gate is connected to the output terminal of the AND gate 24. The output terminal of the AND gate 34 is connected back to the reset terminal R of the flip-flop 22.

The operation of the circuit in FIG. 2 will be described in relation to the waveforms shown in FIG. 3. The top waveform illustrates clock pulses CP that correspond to the clock pulses CP in FIG. 1. These pulses are of short duration and have a repetition rate $f_c$. This corresponds to the time $\tau$ between the leading edges of successive clock pulses. Signal $a$ in FIG. 3 is a DM signal that corresponds to the encoding of an NRZ signal having the sequence 1101000011. This is the signal that is applied to the input terminal 1. The letter $a$ and other small letters in FIG. 2 indicate the points at which the correspondingly identified signals shown in FIG. 3 are present. When this signal is applied to the input terminal 1, it controls the operation of the monostable multivibrators 2 and 3 so that the multivibrator 2 is triggered by the positive-going edge of each of the pulses in the signal $a$ and the multivibrator 3 is triggered by the negative-going edges of the pulses in the signal $a$.

Both of the multivibrators 2 and 3 produce relatively narrow pulses that are combined in the OR gate 4 to form the pulse signal $b$. As indicated in FIG. 3, this pulse signal includes some pulses that are timed to coincide with the clock pulses CP and others that are timed midway between successive clock pulses. Furthermore, there are some relatively long intervals in the pulse wave $b$ in which no pulses are present. The signal generator 10 produces the necessary additional pulses to fill up all of the spaces in the pulse signal $b$. The pulse signal $b$ is applied through the OR gate 11 to the monostable multivibrator 12 which, together with the monostable multivibrator 13 produces an output pulse of the same waveform as each of the pulses $b$ but at a time $\tau/2$ later. Since each of the output pulses of the second monostable multivibrator 13 is also fed back to the OR gate 11 and to the input terminal of the monostable multivibrator 12, the circuit generates a continuous series of pulses $c$ synchronized by the pulses derived by the monostable multivibrators 2 and 3 from the DM signal $a$. The output signal $c$ of the generator 10 is applied to the DM-NRZ conversion circuit 20. In that circuit the signal $c$ is applied to a monostable multivibrator circuit 21 to produce a pulse signal $d$ that corresponds to the pulse signal $c$ but is delayed slightly. This delay is preferably about $\tau/4$, and the monostable multivibrator circuit 21 may actually comprise two monostable multivibrators similar to multivibrators 12 and 13. The pulses $c$ also cause the flip-flop 22 to trigger back and forth at the occurrence of the leading edge of each of the pulses $c$ to form a signal $e$ at the output terminal Q and a signal $f$ at the output terminal Q. The signals $e$ and $f$ enable the AND gates 23 and 24 so that, upon the occurrence of each of the delayed pulses $d$, one or the other of the AND gates, alternately, transmits an output pulse signal. The output signal of the AND gate 23 is indicated in FIG. 3 as the signal $\phi_1$ and the output signal of the AND gate 24 as $\phi_2$. Because of the gating effect of the flip-flop 22, which acts as a selector circuit, the repetition rate of the pulses $\phi_1$ and $\phi_2$ is one-half that of the pulses $d$ and is equal to the repetition rate of the clock pulses CP. Depending upon the delay produced by the multivibrator circuit 21, the leading edge of each of the pulses $\phi_1$ and $\phi_2$ occurs approximately $\tau/4$ after the leading edge of each of the clock pulses CP. In a similar manner, the leading edge of each of the pulses $\phi_2$ occurs approximately $3\tau/4$ after the leading edge of each of the clock pulses CP.

It should be noted that it is possible for the flip-flop 22 to begin its operation in the reverse polarity so that the output terminal Q will produce signal $f$ and the output terminal Q will produce the signal $e$. It is this possible reversal of the signals $e$ and $f$ that causes the reversal of the signals $\phi_1$ and $\phi_2$ and must be corrected by the correction circuit 30, as will be described hereinafter.

In order to decode, or demodulate, the DM signal $a$ it is applied to the input terminal J of the flip-flop 26 and, in inverted form because of the inverter 25, to the terminal K as the signal $g$. The flip-flop 26 is clocked by the clock pulses $\phi_1$ so that, in effect, the state of the DM signal in the first half of each of the bit cells is sampled to determine whether the flip-flop 26 should change states or not. This continuous sampling of the first half of each of the bit cells in the DM signal $a$ and the resultant operation of the flip-flop 26 produces the signal $h$. Essentially, the signal $h$ retains the information of the state of the first half bit of each cell and continues this retained information during the second half bit of the cell. This makes it simple to compare the relative states of the first and second halves.

A comparison takes place in a circuit that is required to generate information for decoding the DM signal $a$ back to NRZ form. If the retained information of the signal $h$ at the output terminal Q of the flip-flop 26 has the same state as the information of the second half bit of the cell in the DM signal $a$, whether that state is 0 or 1, a 0 must be derived for the NRZ signal. On the other hand, if the state of the first half bit of each of the cells is opposite from that of the second half bit of the same cell, a 1 signal must be derived for the NRZ signal. These requirements are satisfied by the exclusive OR gate 27, and the resultant output signal of this OR gate is the signal $j$ in FIG. 3.

This signal is applied to the D input terminal of the flip-flop 28, which is clocked by the clock pulses $\phi_2$ that occur during the second half bit of each of the cells. This, in effect, samples the comparison of the signals $a$ and $h$ and controls the operation of the flip-flop 28 to produce the NRZ signal $k$ at the terminal Q and the system output terminal 5. The terminal Q is caused to have the value 1 when it is clocked at a time that the signal $j$ has the value 1 and a value 0 at the time when the signal $j$ has a value 0.

The operation of the circuit is the same whether the polarity of the output signals of the flip-flop 22 is correct or is inverted. However, the resultant output signal at the terminal 5, as indicated by the signal $k'$ in FIG. 4, will be completely incorrect if the polarity of the signals $e$ and $f$ is reversed. The result of such reversal is that the clock pulses $\phi_1$ occur during the last part of each of the bit cells and the clock pulses $\phi_2$ occur during the first part. This causes the retained information in the signal $h$ at the output terminal of the flip-flop 26 to be information that corresponds to the last half bit of each cell, and this information is retained during the first half bit of the next succeeding cell. Since the comparison that must be made in order to decode the DM signal to NRZ form must be comparison of the two half bits of the same cell, it is obvious that such an incorrect clocking of the flip-flop 26 will lead to an erroneous NRZ signal.

In order to correct the operation of the flip-flop 22 that forms the selector circuit to control the clock pulses $\phi_1$ and $\phi_2$, the signals $h$ and $i$ at the output terminals Q and Q of the flip-flop 26 are connected, respectively, to the J and K input terminals of the flip-flop 31. This flip-flop is clocked by the same clock pulse $\phi_1$ as the flip-flop 26. Each of these clock pulses occurs just at the end of each of the pulses $h$ or in the middle of a two-bit long interval between such pulses. The effect is to delay each of the pulses $h$ by a length of time $\tau$ to form the signal $l$. Thus, the signal $l$ constitutes retained information that should properly correspond to the first half of the preceeding bit cell but which overlaps, in time, the second half of the next bit cell. In order to satisfy the requirements of DM decoding of a 101 sequence this comparison must produce a signal having one state when the state of the signal $a$ is the same as the state of the signal $l$ and must have the opposite state when the signal $a$ has the opposite state from the signal $l$. An exclusive NOR gate fulfills these requirements and produces the output signal $m$ that corresponds to a 1 when the signals $a$ and $l$ are in the same state and a 0 when the signals $a$ and $l$ are in mutually opposite states.

The signal $m$ is compared with a signal that includes information about the comparison of adjacent half bits. Such information is contained in the signal $j$, but the logic of the operation required that this be inverted by the inverter 33 to produce the signal $n$. The signals $n$ and $m$ are connected to the AND gate 24 along with the clock pulse signal $\phi_2$. As a result, the AND gate 34 produces an output signal only when the signal $a$ has the same state as the signal $l$ and the signal $a$ has the same state as the signal $h$ and the clock pulse, or sampling, signal $\phi_2$ is present.

As shown in FIG. 3 the output signal $o$ of the AND gate 34 remains at a fixed value so as not to supply a pulse to the reset terminal of the flip-flop 22 when the clock pulse signals $\phi_1$ and $\phi_2$ have the proper relationship to the clock pulses CP. On the other hand, FIG. 4 shows that when the clock pulses $\phi_1$ and $\phi_2$ are reversed, the AND gate 34, which normally produces an output signal level of 1, drops to the level 0 at the occurrence of the clock pulse $\phi_2$ in the last part of the 101 sequence of the DM signal $a$. This negative-going pulse $o$ resets the flip-flop 22 and reverses its operation so that, thereafter, the clock pulses $\phi_1$ and $\phi_2$ occur in the proper order.

FIG. 5 shows the basic DM pulse relationship in which the first half bit of a cell either has the same or the opposite state from the second half. The signal that includes half bits A and B is representative of the encoding of a 1 signal since A and B are of opposite states. The cell that includes the half bits C and D is representative of the encoding of a 0 signal since both are of the same state.

FIG. 6 shows the division of each of the bit cells into its two halves and includes a representation of the DM signal for the 101 sequence along with two clock pulse signals $CP_1$ and $CP_2$. As shown at the bottok of FIG. 6 if the DM signal were decoded by means of the clock pulse signal $CP_1$, it would properly decode into the signal 11010 that corresponds to the sequence at the top of FIG. 6. On the other hand, if the incorrect clock pulse signal $CP_2$ were used, the comparison of only two adjacent halves of a bit cell would indicate that the DM signal represented an NRZ signal of 0000.

It is to be understood that the invention is directed to a circuit for comparing enough halves of bit cells to determine that a 101 sequence is being properly decoded. The logic circuit shown in FIG. 2 may be modified with this in mind. To consider only two possible modifications, a separate, exclusive NOR gate could have its input terminals connected directly to the input terminal and to the input terminal Q of the flip-flop 26 and its output terminal connected to the AND gate 34 in place of the inverter 33, or the exclusive NOR gate 32 could be replaced by an exclusive OR gate and an inverter. Other modifications may be made within the true scope of the invention as defined by the following claims.

What is claimed is:

1. A circuit for decoding a dynamically modulated non-return-to-zero signal with an encoded clock signal of a predetermined repetition rate comprising:

A. first means connected to receive the dynamically modulated signal and to generate a continuous series of pulses at twice the repetition rate of the clock signal encoded into the dynamically modulated signal;

B. a selector circuit connected to the first means to separate the pulses into first and second interleaved sets of pulse signals, each having a repetition rate corresponding to the repetition rate of the clock signal in the dynamically modulated signal;

C. retaining means connected to receive the dynamically modulated signal and connected to the selector circuit to retain information concerning the state of alternate half bit cells of the dynamically modulated signal and to compare the retained information with the state of part of another half bit cell within a group of three successive bit cells to produce a first signal having one state when the states of the compared half bit cells are in the same state with respect to each other and having the opposite state when the compared half bit cells are in mutually opposite states;

D. first comparison means to compare relative states of a second pair of half bit cells within the group of three bit cells to produce a second signal, at least one of the half bit cells of the second pair being spaced in time by at least one bit cell from one of the half bit cells used to generate the first signal; and E. second comparison means to compare the first and second signals, the second comparison means being connected to the selector circuit to control the operation thereof to select the correct one of the sets of interleaved pulse signals.

2. The circuit of claim 1 comprising connecting means connecting the selector circuit to the second comparison means to compare the first and second signals to enable the second comparison means.

3. The circuit of claim 2 comprising delay means connected to the first means, thereby to delay the continuous series of pulses so that each of the pulses of the continuous series occurs between the beginning and end of each half bit cell.

4. The circuit of claim 3 in which the selector circuit comprises gating means connected to the delay means to produce the first and second interleaved sets of pulse signals, whereby the pulses of the first set occur during one half of each bit cell and the pulses of the second set occur during the other half of each bit cell.

5. The circuit of claim 4 in which the selector circuit comprises a triggerable flip-flop.

6. The circuit of claim 4 in which the retaining means comprises a JK flip-flop, the gating means being connected thereto to supply pulses of one of the interleaved sets as clocking pulses to clock the flip-flop, the dynamically modulated signal being connected to the flip-flop to control the output state thereof at the occurrence of each clocking pulse.

7. The circuit of claim 6 in which the retaining means further comprises an exclusive OR gate, the dynamically modulated signal being connected to one input of the exclusive OR gate, and the output of the JK flip-flop being connected to a second input terminal of the exclusive OR gate.

8. The circuit of claim 7 in which the first comparison means to compare relative states of another pair of half bit cells comprises a second JK flip-flop connected to the gating means to be clocked by the same set of clocking pulses as the first-named JK flip-flop, the output of the first-named JK flip-flop being connected to the second JK flip-flop to control the output thereof at the occurrence of each clocking pulse.

9. The circuit of claim 8 in which the first comparison means further comprises an exclusive NOR gate, the dynamically modulated signal being connected to one input terminal of the exclusive NOR gate and the output of the second JK flip-flop being connected to a second input terminal of the exclusive NOR gate.

10. The circuit of claim 9 comprising an inverter connecting the output of the exclusive OR gate to the second comparison means, the first signal being produced at the output of the inverter.

11. The circuit of claim 10 comprising a D-type flip-flop having clock input terminal connected to the gating means to receive the other of the interleaved sets of pulses as clocking pulses, the output of the exclusive OR gate being connected to a D input terminal of the D-type flip-flop to control the output state thereof at the occurrence of each of the clocking pulses applied thereto, the output state of the D-type flip-flop constituting the non-return-to-zero signal encoded in the dynamically modulated signal.

12. The circuit of claim 11 in which the second comparison means comprises an AND gate comprising:

A. a first input terminal connected to the output of the exclusive NOR gate to receive the second signal therefrom;

B. a second input terminal connected to the output of the inverter to receive the first signal therefrom;

C. a third input terminal connected to the gating means to receive therefrom the same set of pulses applied as clocking pulses to the D-type flip-flop; and D. an output terminal connected to the gating means to control the operation thereof whereby the set of pulses applied as clocking pulses to the D-type flip-flop occur during the second half of each bit cell.

* * * * *